T. L. VIREY.
RUNNER AND TOP NOTCH FOR UMBRELLAS AND SUNSHADES.
APPLICATION FILED DEC. 22, 1919.

1,368,306. Patented Feb. 15, 1921.

INVENTOR
THEODORE LOUIS VIREY
By
HIS ATTORNEY

UNITED STATES PATENT OFFICE.

THEODORE LOUIS VIREY, OF PARIS, FRANCE.

RUNNER AND TOP-NOTCH FOR UMBRELLAS AND SUNSHADES.

1,368,306.   Specification of Letters Patent.   Patented Feb. 15, 1921.

Application filed December 22, 1919. Serial No. 346,646.

*To all whom it may concern:*

Be it known that I, THEODORE LOUIS VIREY, citizen of the Republic of France, residing at Paris, France, have invented certain new and useful Improvements in Runners and Top-Notches for Umbrellas and Sunshades, of which the following is a specification.

This invention relates to improvements in the manufacture of runners and top notches for umbrella and sunshade frames.

These frames comprise a fixed sleeve with an annular collar (top notch) and a movable sleeve with an annular collar (runner). These collars, which receive the ends of the ribs and stretchers constitute essential members of the frames.

Various methods have been employed for making the collars of the frames; but both as regards solidity and as regards ease of manufacture, the methods now in use do not give satisfactory results in all respects.

Turned or cast collars are too breakable; folded collars involve a very delicate process of manufacture and require the employment of a very malleable metal. Generally these collars are of high net cost and they clench very badly. Moreover, with soldering the collar on the body the operation is fairly difficult. The solder runs very frequently into the grooves or notches of the runner or top notch, which involves an additional operation and obliges a certain number of pieces to be rejected. Finally the clenching or soldering is always very visible.

A collar obtained by one of the most perfect processes of manufacture actually in use is formed by two washers separated by a third washer of less diameter, which serves simultaneously to define the separation of the two first mentioned washers and to form the channel in which the ends of the ribs or stretchers are supported, tightened by means of a wire. The sleeve of the movable runner is assembled with the collar formed by the three washers by soldering, brazing or clenching; in every case, two protruding swellings are visible, one on each side of the collar as the result of connecting or attaching the sleeve to the washer assembly.

The present invention enables a collar to be obtained by a simple mode of manufacture, presenting a perfect finished appearance. If the sleeve is assembled by clenching, the collar presents the appearance of that of a soldered or brazed runner or top notch; if the assemblage is effected by soldering or brazing, the solder or spelter is not apparent and cannot run into the notches serving for the reception of the stretchers or ribs.

On the accompanying drawing:—

Figs. 10 and 11 are respectively a plan and vertical section of the complete runner after the notches have been formed in the collar.

Figure 1:
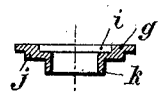
Figures 1 and 2 are respectively section and plan of one of the elements forming the collar.
Figure 3:
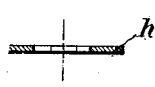
Figs. 3 and 4 are respectively section and plan of another element.
Figure 2:
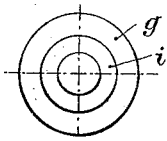
Figure 4:
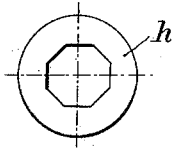
Figure 6:
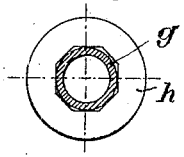
Fig. 6 is a corresponding inverted plan.
Figure 8:
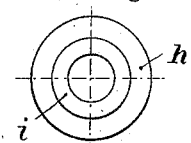
Fig. 8 is a corresponding plan.
Figure 5:
Fig. 5 is an elevation of the two elements assembled before clenching.

The collar is composed of two metal elements or washers $g$ and $h$. The element or washer $g$ cut and stamped from sheet brass, sheet iron or any other suitable metal, has a circular recess $i$ (Fig. 1), a shoulder $j$ and a boss portion $k$. The other element or washer $h$, the diameter of which is equal to that of the largest portion of the element $g$, is cut and has at its center an aperture of polygonal shape (by preference octagonal) the width of which is very slightly greater than the external diameter of the boss $k$.

The principal features of the invention reside in the recess $i$ of the element $g$ and the polygonal shape of the aperture in the washer $h$.

Figure 7:
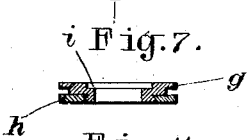
Fig. 7 is a transverse section of the two elements assembled and clenched.

The element $g$ and the washer $h$ are assembled by clenching, an operation analogous to that which is employed for clenching the eyes of tarpaulins or tent cloths (Fig. 7.)

The recess $i$ can receive the clenched or upset end of the sleeve $d$, and no swelling or protuberance is visible and the collar presents the appearance of a soldered article, which gives a high value to the frame without increasing the net cost thereof.

The circular recess or cup $i$ offers an especial advantage in the case of the sleeve *d* being assembled with the collar by brazing or soft soldering. When the sleeve *d* is inserted in the collar, the recess is filled with spelter or tin. The diameter of the recess is calculated to accommodate the volume necessary for the brazing or soldering. On fusion, the spelter or solder remains in the recess and does not overflow on to the collar, which actually happens with methods now in use, which require an additional manipulation to remove the spelter or solder; such operation is very onerous as it produces many throw-outs and a large number of pieces must even be totally rejected.

The recess *i* serves therefore as an automatic measure of the charge of spelter or solder and obviates the inconvenience of solder or the like in the grooves or notches and in the annular channel which receives the wire for attaching the stretchers, or ribs in the case of a top notch.

Figure 9:
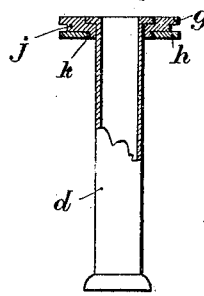
Fig. 9 is an elevation, showing partly in section the runner sleeve assembled with the collar before the notches for the reception of the stretchers have been formed therein.
Figure 11:
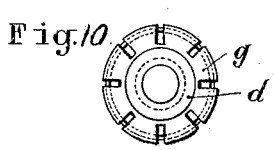

By reference to Fig. 9 of the accompanying drawing, it will be seen that the runner has a perfect finished appearance, without any apparent protuberance.

The element or washer *g* has a shoulder *j*, which serves to limit and determine the approach of and separation of the washers *g* and *h* and to form the channel in which the ends of the stretchers or ribs are located; the wire which ties the stretchers or ribs applies the ends of these latter against the enlargement *j*, which permits free play of the stretchers or ribs whatever be the tightness of the wire.

The second washer *h* forming the collar is cut from sheet iron, brass or any other suitable metal. It is perforated with an aperture of polygonal shape octagonal by preference. The dimensions of the aperture are so determined that the sides of the polygon are almost tangential with the external surface of the cylindrical boss portion *k*. The octagonal shape presents a great advantage which is to avoid the washer turning after the operation of clenching. This result is obtained by virtue of the metal of the cylindrical boss *k* filling the angles of the polygonal aperture on clenching whereby the solidity is further increased. In this manner the notches or grooves serving to receive the stretchers or ribs can be previously made in the washers *g* and *h*, at the time of cutting same, and they remain always in correct relative position, since they cannot turn after the clenching operation.

Having now particularly described and ascertained the nature of my said invention and in what manner the same is to be performed, I declare that what I claim is:—

1. In a device of the character described, the combination with a washer having a spacing shoulder and a projecting central boss, of a second substantially flat washer seating against said shoulder and having a polygonal central aperture through which said boss passes, a portion of said boss being clenched against said second washer.

2. In a device of the character described, the combination with a washer having a spacing shoulder on its under face of smaller diameter than the washer proper and a cylindrical projecting boss of smaller diameter than said shoulder, of a second washer seated against said shoulder and having a polygonal central aperture through which said boss passes.

3. In a device of the character described, the combination with a washer having an undercut recess in its upper face, a spacing shoulder on its lower face and a central cylindrical boss, of a second substantially flat washer having a polygonal central aperture through which said boss passes, said second washer seating against said shoulder and the lower edge of said boss being clenched against said second washer, a sleeve extending through said washers, and a flange on the end of said sleeve bearing in said undercut recess and substantially flush with the upper face of the washer containing said recess.

In testimony whereof I have affixed my signature in presence of two witnesses.

THEODORE LOUIS VIREY.

Witnesses:
  Louis Gardet,
  René Madeuf.